United States Patent [19]

Anderson et al.

[11] 4,101,873
[45] Jul. 18, 1978

[54] DEVICE TO LOCATE COMMONLY MISPLACED OBJECTS

[76] Inventors: Benjamin Ernest Anderson, 8313 Aqueduct Rd., Rockville, Md. 20854; Louise Creegan McIntyre, 2713 Hermitage Dr., Montgomery, Ala. 36111

[21] Appl. No.: 652,157
[22] Filed: Jan. 26, 1976
[51] Int. Cl.² .............................................. G08B 1/08
[52] U.S. Cl. ......................... 340/539; 340/171 R; 340/311; 340/312; 325/55; 325/64
[58] Field of Search ............... 340/224, 280, 312, 311, 340/171 R; 325/55, 64, 466

[56] References Cited

U.S. PATENT DOCUMENTS

| | | | |
|---|---|---|---|
| 2,541,050 | 2/1951 | Halstead | 325/492 |
| 2,579,470 | 12/1951 | Brown | 325/466 |
| 3,314,048 | 4/1967 | Green | 340/311 |
| 3,336,530 | 8/1967 | Sloan et al. | 340/279 |
| 3,403,381 | 9/1968 | Haner | 325/55 |
| 3,465,294 | 9/1969 | Carsello et al. | 340/311 |
| 3,500,458 | 3/1970 | Cannalte | 325/169 |
| 3,686,635 | 8/1972 | Millington et al. | 340/312 |
| 3,768,090 | 10/1973 | Williams | 340/311 |
| 3,790,948 | 2/1974 | Ratkovich | 325/66 |
| 3,818,368 | 6/1974 | Wycoff | 325/64 |

Primary Examiner—John W. Caldwell, Sr.
Assistant Examiner—Donnie L. Crosland
Attorney, Agent, or Firm—Birch, Stewart, Kolasch and Birch

[57] ABSTRACT

Miniaturized coded transmitter and battery powered receivers selectively responsive to a predetermined code transmission are provided with a miniaturized audible signal generator in each receiver such that the receiver, when interrogated by a proper signal, will respond audibly. By placing such receivers on commonly used objects such as eyeglasses, purses and other personal articles, audible location of these articles is accomplished by interrogating each object with a corresponding coded signal and following the audible response from the object to the position of the object to locate the latter. The duty cycle of the receiver is very short and recurrent over intervals less than the known energization interval of the transmitter to insure reception but materially minimize the power consumption of the receivers.

2 Claims, 6 Drawing Figures

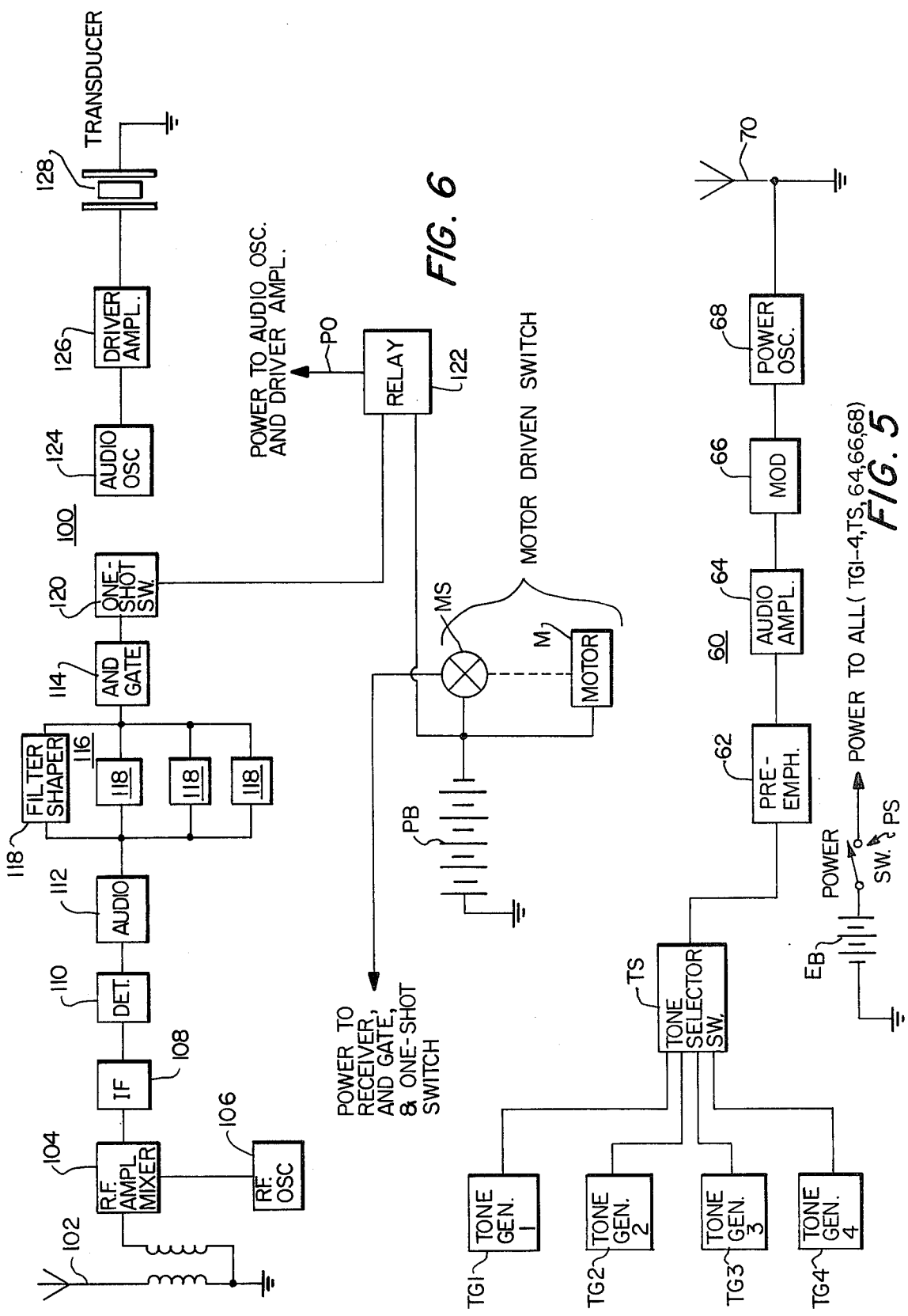

DEVICE TO LOCATE COMMONLY MISPLACED OBJECTS

FIELD OF THE INVENTION

This invention relates to audible indicators and more particularly to selectively actuated miniaturized receivers responsive to propagated radio wave energy from compatible transmitters to provide an audible response to indicate the position of the receiver or the occurrence of a monitored condition.

BACKGROUND OF THE INVENTION

There is a long felt need in the art to provide effective and reliable assistance to persons for locating misplaced articles.

For example, eyeglasses, purses and other relatively small personal articles which are commonly misplaced are particularly difficult to locate for persons having inhibited eyesight.

Furthermore, the locating device should be capable of identifying particular articles by readily discernible audible signals in a simple and foolproof manner to permit a user of the device to interrogate a general area where the misplaced article or articles may be and for the specific article which is desired.

Such a locater device would be additionally useful and much more versatile if it could be operated in an event monitoring mode as well as in a search or position defining mode.

OBJECTS OF THE INVENTION

It is, therefore, an object of the present invention to provide a new and novel acoustic article locating device.

Another object of the present invention is to provide a new and novel article locating device having multimode capabilities including the audible definition of discrete locations and the occurrence of monitored events.

Yet another object of the present invention is to provide a new and novel portable and miniaturized wireless communication system for accomplishing the foregoing objects which incorporates unique power conservation means for increased reliability and increased useful life of self-contained power sources.

These and other objects of the present invention will become more fully apparent with reference to the following specification and drawings which relate to a preferred embodiment of the invention.

SUMMARY OF THE INVENTION

A very small radio receiver is attached to, is incorporated in, or is adjacent to an object to be located or to a position to be determined. The receiver incorporates an audible acoustic generator that is actuated when the receiver receives a signal of the appropriate frequency and modulation.

A small compact radio transmitter is a part of this device. It is carried or worn by or is a part of the accessories of the person seeking to locate the object or position. Alternatively, a receiver is carried and the transmitter, remotely located, indicates a condition to be monitored acoustically by the person or device adjacent to the receiver.

For example, when the transmitter is actuated, the receiver receives and detects the signal and its modulation and actuates an acoustic generator enabling the person to audibly locate the position of an object or be apprised that a given monitored condition has occurred.

The transmitted signal is of low intensity and such frequency so as not to interfere with nearby radio receivers and other communication devices and to meet legal requirements for unlicensed transmitted radiation.

The device is multi-use in that several receivers may be actuated selectively by the operator or controlling means of the transmitter. An operator, for example, by operating a dial or switch or button selects a frequency, or a particular modulation for a "common" frequency, that will activate the acoustic generator only in the receiver tuned to that frequency or in the receiver that is preset to respond to that particular modulation. This permits selective location of different objects.

An alternate selection scheme is for the transmitter to transmit selected, different frequency radiations simultaneously. These are received by and actuate the acoustic generator of only the receiver(s) that is/are preset to accept that combination.

In practice the transmitter for the object locator is a common version of the many varieties available, very low power with a range of approximately 300 feet, providing a modulated carrier where the modulation would be a number of pre-selected single frequency tones.

The transmitters for the remote event indicators or initiators are similar but radiate a signal of greater intensity.

The transmitters are arranged so that for each actuation of the "transmit" button (or switch) the carrier with its modulation is radiated for a brief interval, say 1.2 seconds. Subsequent radiations require additional activations of the switch.

The receivers are micro-miniaturized, very low power versions of the many varieties available. They incorporate, following the detector, a filter and logic network, which is a several source "AND" gate activated by the modulation tones and which provides an output only if the correct combination of tones is received. This acts as an interference buffer and permits selective receiver operation. The output of the "AND gate is applied as the "on" function to a "one-shot" switching device which applies power to the acoustic generator for a brief interval.

The acoustic generator is comprised of an oscillator, driver amplifier and transducer. To accommodate the varying physiological capabilities of the human ear, a tone matching the more sensitive frequency region of human hearing is generated, in the vicinity of 2000 – 4000 Hz., and radiated at an acoustic level at the source of approximately 20 microwatts/cm$^2$. This intensity is well below the threshold of feeling and will provide an intensity at 15 m. of approximately $10^{-8}$W/cm$^2$. This estimate includes 6 db. for transducer coupling efficiency and 12 db. bias for physiologically aged hearing.

It is intended that the receiver be a very small device and the incorporated acoustic generator to meet this requirement must necessarily radiate as a point source i.e. the transducer diameter is smaller than a wavelength of radiated acoustic energy. ($D<\lambda$) The transducer is typically a 1.0 square cm. disc of one of the Barium Titanate ceramic mixtures.

Three advantages accrue from this operating mode. (1) Omnidirectional acoustic radiation is necessary for aural location without built-in masking or nulls due to the random orientations of the objects to be located and this is provided by point-source radiation ($D<\lambda$).

(2) The use of a single frequency of radiated acoustic energy permits a measure of tuning of the transducer which increases the energy efficiency.

(3) The tone bursts of acoustic energy for fractional second periods, only on command, conserve energy.

The receiver incorporates a unique method of conserving energy. It is not necessary for the receiver to be continuously on for it to receive and act upon the transmitted signals. The receiver needs to be "on" periodically for a brief interval only, of such duration that it can receive the transmitted signal, detect the modulation, filter and apply the modulation to the "AND" gate, and apply the output of the "AND" gate to a "one-shot" switch.

Therefore, the receiver is turned "on" by an electronic or motor-driven switch for say 2.0 milliseconds, every second. That is, it is turned "on" 1/500 of the time. Since the transmitted radiation is "on" for slightly in excess of one second during the transmitter activation period, it is evident that the receiver will be on at least once during the transmitter "on" interval and hence can receive and act upon the received radiation.

Typical small receivers commonly consume tens to hundreds of microwatts in continuous operation. Electronic switches of the unsymmetrical multivibrator type or motor-driven switch mechanisms similar to those utilized in battery-powered wrist watches operate on a fraction of a microwatt. Either of these types applied to turn on the receiver will reduce the rate of energy consumption by two to three orders of magnitude permitting the receiver to operate approximately one year without replacement of the energy source.

BRIEF DESCRIPTION OF THE DRAWINGS

FIG. 5 is a block diagram of a multiple tone transmitter of the present invention; and FIG. 6 is a block diagram of another preferred embodiment of a receiver of the present invention.

DETAILED DESCRIPTION OF THE DRAWINGS

Figure 1:
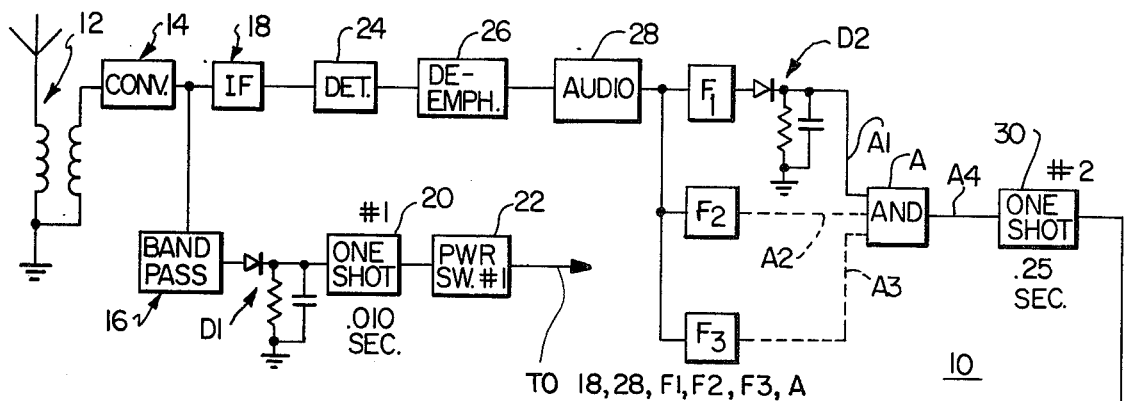
FIG. 1 is a schematic diagram of a first preferred embodiment of a receiver of the present invention.

Referring to FIG. 1, a preferred embodiment of a receiver 10 will now be described which is responsive to a predetermined combination of input frequency modulations from a transmitter to be described hereinafter with reference to FIG. 5.

The receiver 10 includes an antenna 12 which is coupled to a constantly energized converter stage 14, the latter driving the inputs of a band pass filter 16 and an intermediate frequency amplifier (IF) stage 18.

The band pass filter 16 drives, via a rectifier and shaper circuit D1, a first one-shot switch 20 which, in turn drive a first power switch 22.

The IF stage 18, drives a detector stage 24, which in turn drives a de-emphasis stage 26. The de-emphasis stage 26 drives an audio amplifier stage 28 and the output of the latter is commonly applied to first, second and third selectively tuned filter stages F1, F2 and F3, respectively.

The output circuit D2 of the first selective filter stage F1 is typical of that of the remaining filters F2 and F3 and comprises a rectifying and shaper circuit. All three outputs of the said filter F1 — F3 are rectified and shaped and applied to a respective one of three input terminals A1, A2 and A3 of an AND gate A.

The output A4 of the AND gate A drives a second one-shot switch 30 which in turn, drives a second power switch 32. Energization of the second power switch 32 drives a power oscillator 34 which in turn drives a miniaturized acoustic generator or beeper 36.

The acoustic generator or beeper 36 is preferably of the barium titanate type such as a disc of that material having an area of one (1) square centimeter. Such "beepers" are available in micro-miniaturized IC chip circuitry. One example of a commercially available "beeper" chip is an MK 50250. Micro speakers suitable for use with such chips are commercially available. Such speakers are advertised, for example, as "Digital "Beep" Alarm Micro Speaker" on page 93 of the July 1975 issue of Popular Electronics.

The selective tone filters F1, F2 and F3 are basically active parallel - T networks (selective feedback amplifiers) having a common connection L1 for a first input terminal 38A, emitter terminal 40E of a transistor 40 and first output terminal 42A.

The second input terminal 38B is connected through a first resistor R1A to the base terminal 40B of the transistor 40 while the second output terminal 42B is directly connected to the collector 40C of the transistor 40. An output resistance RO is connected across the output terminals 42A, 42B.

Further, a second resistor R1B of identical value to the first (R1A) is connected through third and fourth identical resistors RA and RB, in series, to the collector terminal 40C and through a parallel path consisting of series connected first and second equal capacitors CA and CB to the said collector terminal 40C.

In the first parallel path, the junction between the third and fourth resistors RA and RB is connected to ground through a third capacitor 2C, so designated because it is selected to have twice the capacitance value of the first and second capacitors CA, CB.

In the second parallel path, the junction between the first and second capacitors CA, CB is connected to ground through a fifth resistance R/2, so designated because its value is one-half that of the third and fourth resistors RA, RB.

The parameters of the various components are chosen as follows:

RA = RB
R1A = R1B
CA = CB
CA = 1/WRA
R1A >> RA
RO << RA

Bandwidth at 3db = (4fo/Gain) where fo is the selected frequency and where Gain = (E out/E in) at fo.

Figure 2:
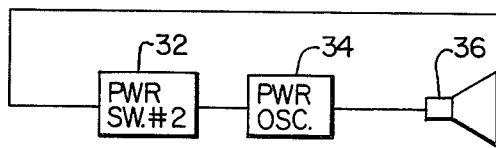
FIG. 2 is a detailed schematic of a tone filter for the receiver of FIG. 1.
Figure 2:
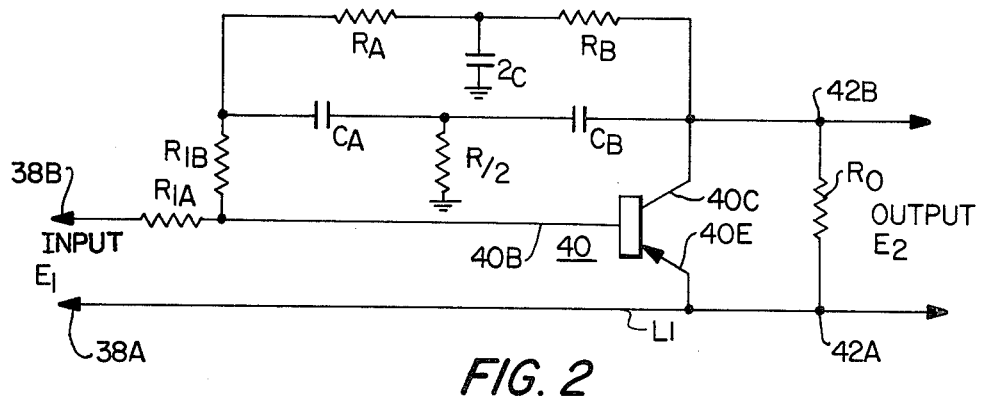

In FIG. 2, the input voltage (E in) is designated E1 and the output voltage (E out) is designated E2.

Figure 3:
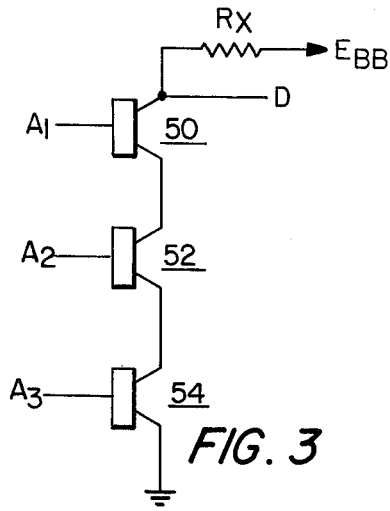
FIG. 3 is a detailed schematic of an AND gate logic network of the present invention.

The AND gate A is preferably of the direct coupled lowlevel logic variety and is shown in FIG. 3 as including first, second and third transistors 50, 52, 54 having their basic terminals comprising, respectively, the inputs A1, A2, A3 of the AND gate A. The collector emitter paths of the transistors 50, 52, 54 are connected in series to ground at one side and through a bias resistor RX to a source of bias potential EBB.

The output terminal D of the AND gate A is connected at the junction of the resistor RX with the collector terminal of the first transistor 50. The logic is D = A1 A2 A3, i.e., the output occurs when all input terminals A1, A2 and A3 are receiving an input.

All of the base (input) signals in the AND gate A work from a common ground level, thus precluding the AND gate A from drawing quiescent current thereby assisting in power conservation in the receiver 10.

Figure 4:
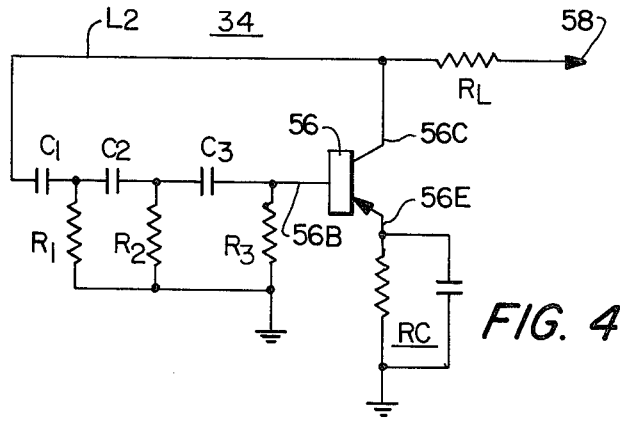
FIG. 4 is a detailed schematic of an audible tone generator of the present invention.

The power oscillator 34 or audible tone generator for driving the acoustic generator 36 of the receiver 10 is a phase shift type oscillator as shown in detail in FIG. 4.

A transistor 56 comprises the active element of the oscillator 34 and has base, collector and emitter terminals 56B, 56C and 56E, respectively.

The collector 56C is connected through a load resistor RL to the oscillator output terminal 58 and through a feedback lead L2 to one side of a first capacitor C1. The opposite side of the first capacitor C1 is connected to ground through a first resistor R1 and to one side of a second capacitor C2. The other side of the second capacitor C2 is connected to ground through a second resistor R2 and to one side of a third capacitor C3. The other side of the third capacitor C3 is connected to ground through a third resistor R3 and directly to the base 56B of the transistor 56.

The oscillator 34 is completed by connecting the emitter terminal 56E to ground through a parallel resistance capacitance RC.

Examplary design parameters for the oscillator 34 are as follows:

$$C1 = C2 = C3 = 0.0046 \text{ uf}$$

$$R1 = R2 = R3 = 10K$$

$$f = 2000 \text{ Hz}$$

The energy budget for the receiver is based on the battery capability. A typical very small "hearing aid" battery has twenty milliampere-hours at 1.34 Volts energy and is restricted to a maximum current flow of ten milliamperes (0.010A).

The maximum permissible power drain then is $$1.3V \times .01A = .013W = 1.3 \times 10^4 \text{ micro-watts}$$

The power is apportioned as follows - where:

$I_t = I_{tone}$ = Current drawn by one shot #2, Power Switch #2, and the Audio Power Oscillator - all "on" simultaneously (1.25 seconds/day)

$I_p = I_{pulse}$ = Current drawn by one shot #1, Power Switch #1, I.F. Ampl., Audio Ampl., Active Tone Filters and AND gate - all "on" simultaneously (0.005 second/day)

$I_{ss} = I_{steady\ state}$ = Current drawn by the converter continuously.

$$1.3 \times 10^4 \mu W = 1.3 I_t + 1.3 \frac{I_t}{50} + 1.3 I_{ss}$$

$(I_p = \frac{I_t}{50})$

Assume $I_{ss} << I_t$
Then $I_t = 10^4/51/50 = 9803 \mu A$
$Q_t = 1.3V \times 9.8 \times 10^3 \mu A \times 456.25 \text{ sec.} = 5.8 \times 10^6 \mu W \text{ sec.}$ $Q_p = \frac{1.3V \times 9.8 \times 10^3}{50} \times 12.25 \text{ sec.} = 4650 \mu W - \text{sec.}$ $Q_{ss} = Q$ Batt. $- Q_t - Q_p = 2.97W -$ yr. $\times 31.5 \times 10^6$ sec./yr.
$= - Q_t - Q_p = 93.8 \times 10^6 \mu W -$ sec.
$- 5.8 \times 10^6 \mu W -$ sec.
$= 88 \times 10^6 \mu W -$ sec.

-continued $$P_{ss} = \frac{Q_{ss}}{31.5 \times 10^6} = \frac{88 \times 10^6 \mu W - \text{sec.}}{31.5 \times 10^6 \text{ sec.}} = 2.79 \mu W$$

$I_{ss} = \frac{2.79 \mu W}{1.3V} = 2.15 \mu A.$ $P_t = 1.3V \times .0098a. = 12.74$ milliwatts $P_p = 1.3V \times \frac{I_t}{50} = 1.3 \times \frac{.0098}{50} = 255. \mu W.$ $I_{max} = I_{ss} + I_t + I_p = 2.15 \mu A + 9803 \mu A + 196 \mu A$
($\mu$ = micro = $\times 10^{-6}$)
$= 10001.1 \mu A$
$= 10 \text{ ma}$ To illustrate the influence of Iss, assume $I_{ss} = 2.0 \mu A$ (versus 2.15 above)
then $\frac{2.0}{2.15} = .93$
$1.0 - .93 = .07 = 7\%$
7% of Q Batt. $= .07 \times 93.8 \times 10^6 \mu W -$ sec.
$= 6.6 \times 10^6 \mu W -$ sec./year
or 5.16 seconds of additional audible tone pulses.

The above budget is conservative in that E Batt. = 1.34V vs. 1.3V used in computation.

In the present invention, the transmitter 60, as shown in FIG. 5, is intended to be very small and light in weight. It does not, however, have the stringent energy conservation requirement of the receiver.

For example — using the same small battery as the receiver — 1.3V at 20 ma — hr and with same 10 ma. maximum current drain.

The max power = .013 watts

Ox/year = $.013W \times .010$ sec/pulse $\times 10$ pulses/day $\times \frac{365 \text{ days}}{\text{year}}$
$= .475w -$ sec/year
$Q$ Batt. $= 0.026 W -$ hours $= 93.50 W -$ secs.

Thus, under the foregoing parameters the battery would provide one-hundred ninety six years of operation! This indicates that the useful life of the battery would be at least its rated shelf life.

A very efficient use of battery power is thus provided by the transmitter of the present invention.

The transmitter 60 includes first, second, third and fourth tone generators TG1, TG2, TG3, TG4, respectively, all connected to one side of a tone selector switch TS, the latter having its output connected through a pre-emphasis stage 62, audio amplifier stage 64, modulator stage 66, the latter driving a power oscillator stage 68 which in turn, drives the antenna 70 of the transmitter 60.

A battery source $E_B$ via a power switch PS directs power to the tone selector stage 62, audio amplifier 64, modulator 66 and power oscillator 68 in a conventional manner.

Power transfer to the tone generators TG1 — TG4 is selectively controlled by the tone selector switch TS which is a permutation switch having four positions, each of which corresponds to a different combination of three tone generators. In each position, therefore, three of the four tone generators TG1 — TG4 are supplied with power from the battery $E_B$ to ultimately constrain the transmitter 60 to emit a predetermined combination of three tones in the modulated signal propogated from the antenna 70.

The operation of the transmitter 60, is as follows:

(1) The tone selector switch TS is manually pre-set to one of four positions corresponding to the receiver to be activated. This switch directs power to 3 of the 4 tone generators TG1 — TG4 and disconnects the undesired tone generator output from the pre-emphasis network 62. (2) The power switch PS is a manually operated impulse switch with contact make time of 0.010 sec. and with automatic reset to open. It provides battery power to all active circuits simultaneously.

(3) The pre-emphasis network 62 boosts the high frequency tones relative to the lower frequency tones to compensate for low higher frequency energy as a consequence of the modulation technique.

(4) The audio amplifier 64 amplifies the selected tones and drives the input of the reactance modulator 66.

(5) The reactance modulator 66, typically a reactance diode, is coupled to the tank circuit of the power oscillator 68 and varies the tank frequency as a function of the audio (or supersonic) driving frequencies.

(6) The power oscillator 68 is a standard 10 milliwatt input circuit, suitably biased to insure prompt and rapid build-up and is coupled to a very reactive load since the "antenna" 70 is very short.

(7) The antenna 70 is a very short (vs) stub assembled as part of the case of the transmitter 60. Since the anticipated range for many applications is only a few hundred feet the coupling is adjusted under standard conditions to provide a sufficient signal with margin to activate the nominal sensitivity receiver.

With the foregoing operation of the transmitter 60 now described, the following responsive operation thereto of the receiver 10 of FIG. 1 is as follows:

(1) Converter 14 is always "on", first one-shot switch 20 is quiescent on, and first Power Switch 22 is "cut-off";

(2) Incoming modulated R.F. signal detected by the antenna 12 is mixed in converter 14 and the beat signal therefrom is applied to Band Pass Filter 16 and to Intermediate Frequency Amplifier 18;

(3) Band Pass Filter 16 selects the beat frequency and passes it to rectifier D1 which applies a D.C. pulse to the first One Shot Switch 20;

(4) One Shot Switch 20 fires "on" for 0.005 seconds and turns on first Power Switch 22 for 0.005 seconds;

(5) First Power Switch 22 applies power to the I.F., stage 18, audio amplifier 28, active filters F1, F2, F3 and to AND gate A.

(6) The tones modulating the received carrier will be detected, amplified, filtered, rectified and applied as inputs to the AND gate A;

(7) If the AND gate receives the "correct three tones" it will output and turn on the second one-shot switch 30 which has been in a quiescent "off" state;

(8) Second one shot switch 30 will turn on the second power switch 32 for 0.25 seconds which in turn applies power to the audio power oscillator 34 which drives the acoustic transducer 36, producing a 0.25 second duration audible tone.

Referring now to FIG. 6, an alternate form of receiver 100 is shown as including an antenna 102, an R.F. amplifier mixer 104 driven by a local RF oscillator 106 and in turn driving an IF stage 108, detector stage 110 and audio amplifier stage 112.

The output of the audio amplifier stage 112 drives an AND gate 114 through a filter shaper network 116 of parallel filter-shaper circuits 118 which are responsive to predetermined detected modulations emitted from the audio amplifier stage 112 to energize the AND gate 114 in response thereto.

The AND gate 114 thus drives the one shot switch 120 which in turn selectively enables a control relay 122 which actuates an audio oscillator 124 and driver amplifier 126 to energize an acoustic transducer 128 and emit a beep or other tone in response to a received signal of proper form.

The control relay 122 is connected from the negative terminal of a battery PB which has its positive terminal grounded. The relay output lead PO is schematically shown as supplying power to the audio oscillator 124 and driver amplifier 126 stages in response to the output (energization) of the one-shot switch 120 as constrained by the AND gate 114.

Power is cyclically applied to the basic receiver elements including the AND gate 114 and the one-shot switch 120 from the battery PB by means of a motor driven switch MS driven by a motor M which is energized by the battery PB.

The receiver 100 is turned "on" by the motor driven switch MS for a period of 20 milliseconds per second, i.e., 1/500 of the time.

Now, if the transmitter 60 or other transmitter is energized for, say, 1.2 seconds, then it becomes evident that at source time during this transmit interval, the receiver will be "on" and responsive to transmitted data.

The resulting power savings over continuous receiver operation are quite dramatic. For example, if the motor driven switch MS is of the type used in batting powered wrist watches and the like as known in the art, the power requirement is on the order of 0.5 microwatts. With normal operating power for the receiver 100 of say 100 microwatts, the ratio of continuous power to reduced (intermittent) power comsumption is on the order of 143 to one.

If the switching power is reduced to 0.1 microwatt, receiver power to 50 microwatts and receiver on-time to 0.001 seconds, then energy consumption reates may be reduced from continuous operating modes by a factor of 320.

In the embodiment of FIG. 6, an exemplary power range for the audio generator portion of the receiver 100 (audio oscillator 124, driver 126, transducer 128) is 200 microwatts for one quarter second pulses for perhaps ten operating cycles per day. The quarter second pulses are effected by the "on" time of the control relay 122. This, combined with 0.5 microwatt switch power and 100 microwatt receiver power results in a power reduction factor of 140 in the intermittent mode of operation.

From the foregoing specification and drawings it can readily be seen that the present invention provides a highly versatile and power conserving communication and locating device which may be readily adapted to numerous useful tasks.

Clearly, one such task is the location of an object to which one of the receivers of the present invention is attached, juxtaposed or incorporated therein. Further, by means of multi-tone or multiple-modulation coding, a particular one of a plurality of objects may be audibly located.

Another audio locater function is that of specific geographic locations or positions for the visually handicapped. For example, by positioning several coded receivers about an apartment, the visually handicapped person by use of a coded transmitter, can familiarize an orient himself to his surroundings.

If the tone selector switch TS of the transmitter 60 (FIG. 5) is activated by a timing device, for example, a receiver worn by a person will be activated to indicate the occurrence of a timed event such as baking a cake, roasting a turkey, etc.

Another could call each of several children by coding a transmitter to a given receiver carried on the person of each child by selective actuation of the tone selector switch TS of FIG. 5.

In fact, the tone selector switch TS is a generic showing for any event or parameter monitoring a switch means which will permutate and combine multiple tones or other forms of modulation to effect a "coded" transmission capable of selective detection and audible or other selectively controlled response under the present invention.

What is claimed is:

1. Audible communication means for selectively generating an audible signal at one of a plurality of random positions to be located within a general area comprising:
    transmitter means adapted to be utilized by an individual having a plurality of tone generator means selectively interconnected to provide a plurality of transmitted signals corresponding to a respective plurality of random positions;
    a plurality of receiver means being attached to corresponding ones of a respective plurality of objects at said random positions, one to locate each of said objects at said random positions, each of said receiver means comprising:
    a power source means;
    tuning means responsive to only a corresponding one of said transmitted signals and an audio generator means emitting an audible signal in response to said corresponding one of said transmitted signals to audibly identify the location of a corresponding one of said objects at said random positions to said individual;
    detector circuit means cyclically energized by said power means and including AND gate means responsive to receipt of a predetermined transmitted signal to provide a control output;
    one-shot switch means responsive to said control output to provide a power on signal;
    audio generator means for providing an audible output signal; and
    wherein said power means comprises:
        a battery;
        motor driven switch means powered by said battery and cyclically energizing said detector circuit means and said one-shot switch means; and
        relay means responsive to said power on signal interconnecting said battery means to said audio generator means to energize the latter to provide said audible output signal.

2. The invention defined in claim 1, wherein said transmitter is energized for at least a given first time interval for each energization; and
    wherein said power means cyclically energizes and de-energizes said receiver means for a selected short duration at second recurrent intervals, each of lesser duration than said first interval.

* * * * *